United States Patent
Watkins

(10) Patent No.: US 7,360,752 B2
(45) Date of Patent: Apr. 22, 2008

(54) APPARATUS AND METHOD FOR INSTALLING LINES IN CONDUITS

(76) Inventor: Charles W. Watkins, 10337 Nightmist Ct., Columbia, MD (US) 21044

( * ) Notice: Subject to any disclaimer, the term of this patent is extended or adjusted under 35 U.S.C. 154(b) by 122 days.

(21) Appl. No.: 11/154,506

(22) Filed: Jun. 16, 2005

(65) Prior Publication Data

US 2006/0284148 A1 Dec. 21, 2006

(51) Int. Cl.
*B66F 3/00* (2006.01)
(52) U.S. Cl. .............................. 254/134; 254/134.3 FT
(58) Field of Classification Search ................ 254/134, 254/134.3 FT, 134.3 R
See application file for complete search history.

(56) References Cited

U.S. PATENT DOCUMENTS

| | | | |
|---|---|---|---|
| 252,956 A | 1/1882 | Loane | |
| 2,729,424 A * | 1/1956 | Eppensteiner | ....... 254/134.3 FT |
| 3,107,379 A | 10/1963 | Hill | |
| 3,179,375 A | 4/1965 | Hamrick | |
| 3,669,087 A | 6/1972 | Hamrick et al. | |
| 3,793,732 A | 2/1974 | Hamrick | |
| 4,185,809 A | 1/1980 | Jonnes | |
| 4,390,148 A * | 6/1983 | Cudmore | ..................... 244/19 |
| 4,498,659 A | 2/1985 | Brockelsby, III | |
| 4,596,381 A | 6/1986 | Hamrick | |
| 4,848,734 A | 7/1989 | Ford | |
| 4,941,774 A | 7/1990 | Harmstorf | |
| 4,951,923 A | 8/1990 | Couture | |
| 5,011,332 A | 4/1991 | Kunze et al. | |
| 5,121,644 A | 6/1992 | Grey et al. | |
| 5,156,376 A | 10/1992 | Spicer | |
| 5,205,542 A | 4/1993 | Keeble | |
| 5,211,377 A | 5/1993 | Griffioen et al. | |
| 5,236,177 A | 8/1993 | Tamm | |
| 5,360,291 A | 11/1994 | Shimizu | |
| 5,374,034 A | 12/1994 | Flores, Sr. et al. | |
| 5,456,450 A | 10/1995 | Reeve et al. | |
| 5,730,424 A | 3/1998 | Flores, Sr. | |
| 5,762,321 A | 6/1998 | Petersen et al. | |
| 5,813,658 A | 9/1998 | Kaminski et al. | |
| 5,906,357 A | 5/1999 | Munson, Sr. | |
| 5,967,495 A | 10/1999 | Kaminski et al. | |
| 6,012,621 A | 1/2000 | Hoium et al. | |
| 6,019,351 A | 2/2000 | Allen | |
| 6,116,578 A | 9/2000 | Pruett | |
| 6,130,975 A | 10/2000 | Eyres | |
| 6,254,026 B1 * | 7/2001 | Tsai | ........................ 242/390.2 |
| 6,264,170 B1 | 7/2001 | Casella | |
| 6,264,171 B1 | 7/2001 | Hoium et al. | |
| 6,341,188 B1 | 1/2002 | Serrander et al. | |
| 6,402,123 B1 | 6/2002 | Rivard | |
| 6,691,734 B2 | 2/2004 | Beals et al. | |
| 6,736,156 B2 | 5/2004 | Beals et al. | |
| 7,137,618 B2 * | 11/2006 | Koenecke | .................... 254/372 |
| 2002/0114595 A1 | 8/2002 | Potash | ........................ 385/100 |
| 2003/0068143 A1 | 4/2003 | Martinez et al. | ............ 385/100 |
| 2005/0258411 A1 * | 11/2005 | Zeitler | ................ 254/134.3 FT |
| 2006/0231811 A1 * | 10/2006 | Koenecke | ................... 254/228 |
| 2006/0284148 A1 * | 12/2006 | Watkins | ................... 254/134.4 |

* cited by examiner

*Primary Examiner*—Lee D Wilson
(74) *Attorney, Agent, or Firm*—Whiteford, Taylor & Preston LLP; Jeffrey C. Maynard

(57) ABSTRACT

An apparatus for placing lines in a conduit is disclosed. The apparatus uses a battery powered electric fan in an aerodynamically shaped body to fly through the conduit pulling a jet line. The apparatus is used instead of "fish" tape, vacuum, or compressed air to draw a jet line through the conduit.

14 Claims, 3 Drawing Sheets

APPARATUS AND METHOD FOR INSTALLING LINES IN CONDUITS

BACKGROUND OF THE INVENTION

1. Field of the Invention

This invention generally relates to the field of line threading devices for elongated conduits and, in particular, to an apparatus and method of installing utility lines, such as telephone, fiber optic, or electrical wiring in a conduit.

2. Background of the Prior Art

As most electricians are aware, one of the most difficult chores that they encounter is the threading of wires and cable through elongated tubular conduits. Depending on the gauge and composition of the wires, as well as the length of the conduits and the number and sharpness of the bends in the conduit, feed of the wires through the conduits can be a difficult and trying chore. These difficulties have spurred much activity in terms of time and effort in an attempt to devise a suitable system or apparatus for "fishing" conduit that would be effective, inexpensive, and simple enough to be conducted by unskilled labor working under the direction of a professional electrician.

One approach has involved the use of a "fish tape" which consists of a thin, highly flexible metal strap or tape that can be inserted into one end of the conduit and pushed through and out the other end of the conduit. The wire is then connected to the fish tape at one end of the conduit and the fish tape drawn back through the conduit with the wire attached. Such a system works fairly well, where the length of conduit is short, and the bends in the conduit are kept shallow and few in number. However, this is not always practicable.

Another approach in common use involves introducing a light weight rope, cord, or thread into the conduit by attaching it to a projectile or missile that is then inserted into one end of the conduit and driven through by air or other fluid admitted under pressure into the conduit behind the projectile. Alternatively, a partial vacuum can be created in the conduit ahead of the projectile, causing the projectile to be sucked through the conduit. In each instance, the cord is drawn with the projectile or missile through the conduit, the cord then being useful as a pull line to introduce the wire.

Such projectiles or missiles have taken several forms. For example, it was early proposed that the missile be light in weight and fit loosely within the conduit so that it would not catch as it is driven through the conduit. Such a projectile was usually given the shape of a cone, a cup, or a thimble and arranged so as to present a flared wide area surface to increase its response to the force of the pressurized fluid. However, as the projectile moved away from the source of pressurized air, the inefficiency of the system became more pronounced, and the missile would decelerate and often come to a halt short of the conduit end. The employment of such a loosely fitting missile was particularly unsatisfactory where it was proposed to move the projectile in response to creation of a vacuum in the conduit ahead of the missile.

Although each of the projectiles worked satisfactorily under controlled circumstances, each presented its own special problems. In many instances, the conduit may be in the ceiling requiring the high pressure or vacuum hose to be lifted over the operator's head throughout the duration of the procedure. Often, the project would get stuck in the conduit. Particularly in the case of very long conduits, the pressure or vacuum system tends to be less effective.

Accordingly, there remains a need for a safe and simple apparatus that is effective in threading a line into a conduit to install telephone, electric, or fiber optic lines.

SUMMARY OF THE INVENTION

It is, therefore, an object of the present invention to provide a device for installing lines in conduits that avoids the disadvantages of the prior art.

It is another object of the present invention to provide a conduit "mouse" that flies through the conduit. A related object is to provide a conduit "mouse" having a fan and motor. A further related object is to provide a conduit "mouse" that can pull a jet line through a conduit.

Another object of the present invention is to provide a device for installing lines in conduits that is effective in elongated conduits up to several hundred feet long. A related object of the present invention is to provide a device for installing lines in conduits that is effective in conduits of varying diameters.

In accordance with the above objects, a device for installing lines in conduits is disclosed. The device uses a battery powered electric fan in an aerodynamically shaped body to fly through the conduit pulling a jet line. The apparatus is used instead of "fish" tape, vacuum, or compressed air to draw a jet line through the conduit.

BRIEF DESCRIPTION OF THE DRAWINGS

The above and other features, aspects, and advantages of the present invention are considered in more detail, in relation to the following description of embodiments thereof shown in the accompanying drawings, in which.

DETAILED DESCRIPTION OF THE INVENTION

The invention summarized above and defined by the enumerated claims may be better understood by referring to the following description, which should be read in conjunction with the accompanying drawings in which like reference numbers are used for like parts. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
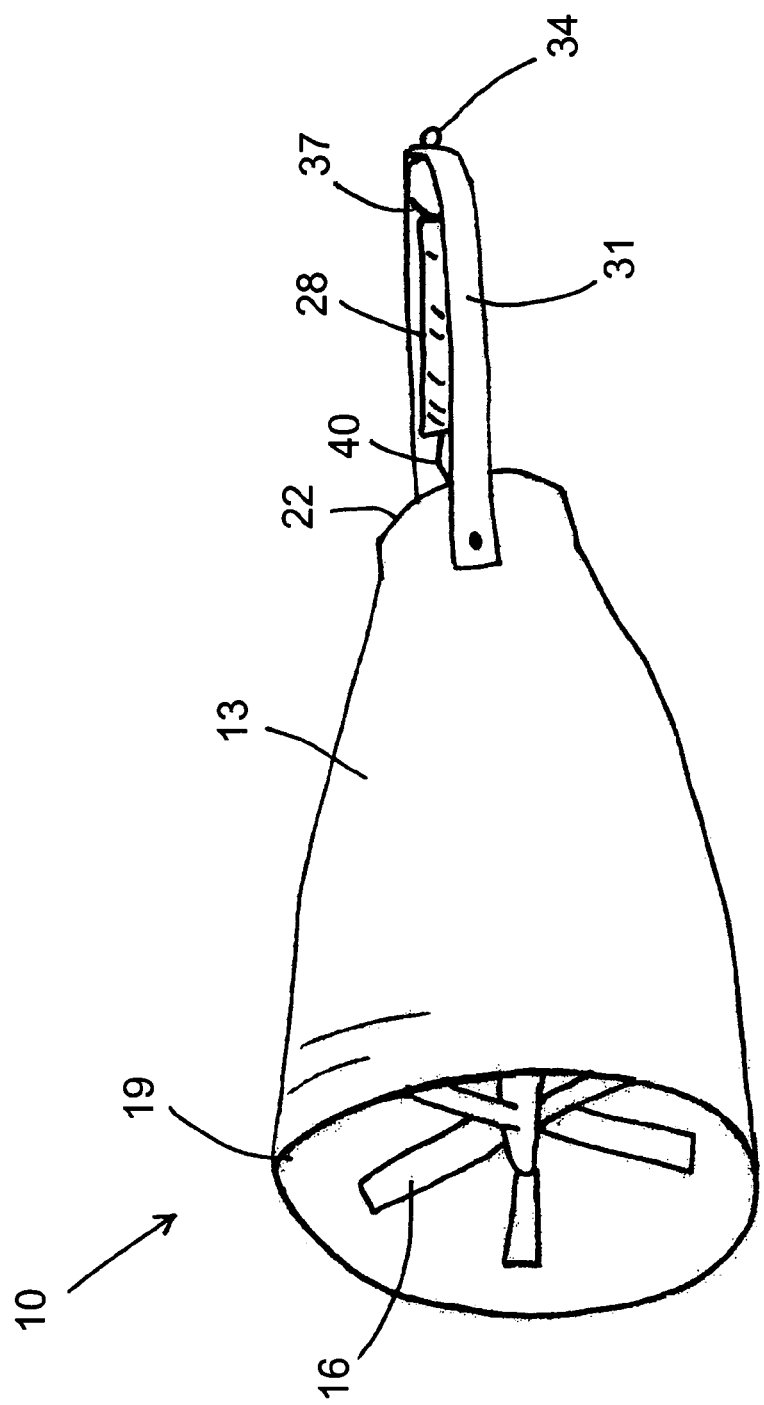
FIG. 1 shows a perspective view of a line installing apparatus according to one embodiment of the present invention.
Figure 2:
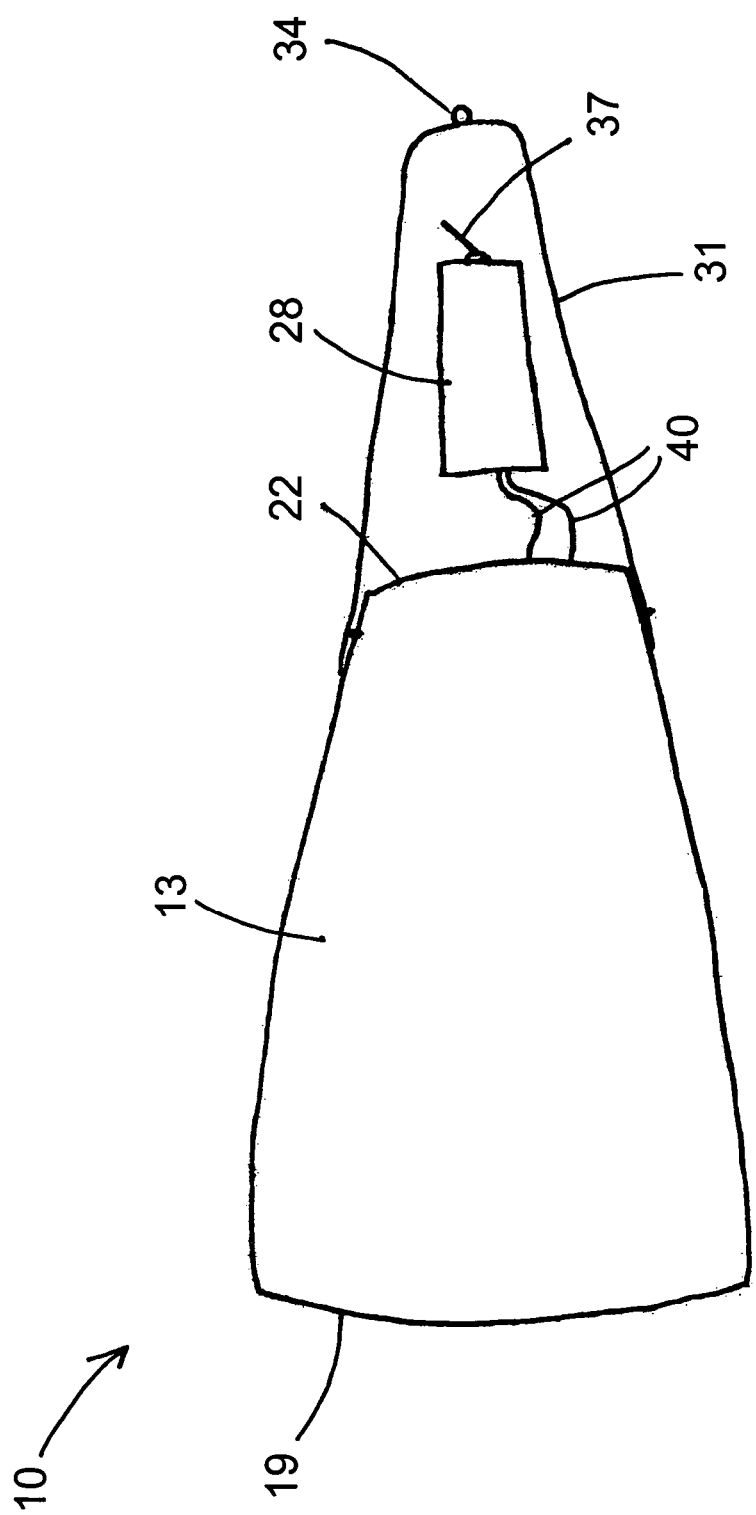
FIG. 2 shows a plan view of a line installing apparatus according to one embodiment of the present invention.

Referring to the figures, FIGS. 1 and 2 show a conduit "mouse", indicated generally as 10, according to the present invention. The "mouse" 10 comprises a truncated cone-shaped body 13 that is generally hollow, shaped in an aerodynamic manner, and open on a both ends. A turbo fan 16 is mounted inside the body in such a manner that airflow, during operation of such fan 16, enters in through the base of the cone, a somewhat larger end 19, and exits through the truncated top of the cone, a somewhat narrower end 22. In a preferred embodiment, the fan 16 is rotated by an electric motor 25 that is powered by a battery 28.

A harness 31, pivotably attached to the narrow end 22 of the body 13, holds the battery 28 and provides an articulable support for the battery 28. A bracket (not shown) may be constructed as part of the harness 31 to hold the battery 28; however, the battery 21 may be attached to the harness 31 by any suitable means. In a preferred embodiment, the harness 31 may be approximately the same length as the body 13. Of course, other appropriate sizes can be used. On the end of the harness 31 away from the body 13, a connection point, such as an eye or ring 34, is provided. The ring 34 should be attached to the harness 31 such that the ring 34 is permitted to rotate about a circumference that is aligned with the longitudinal axis of the body 13.

Figure 3:
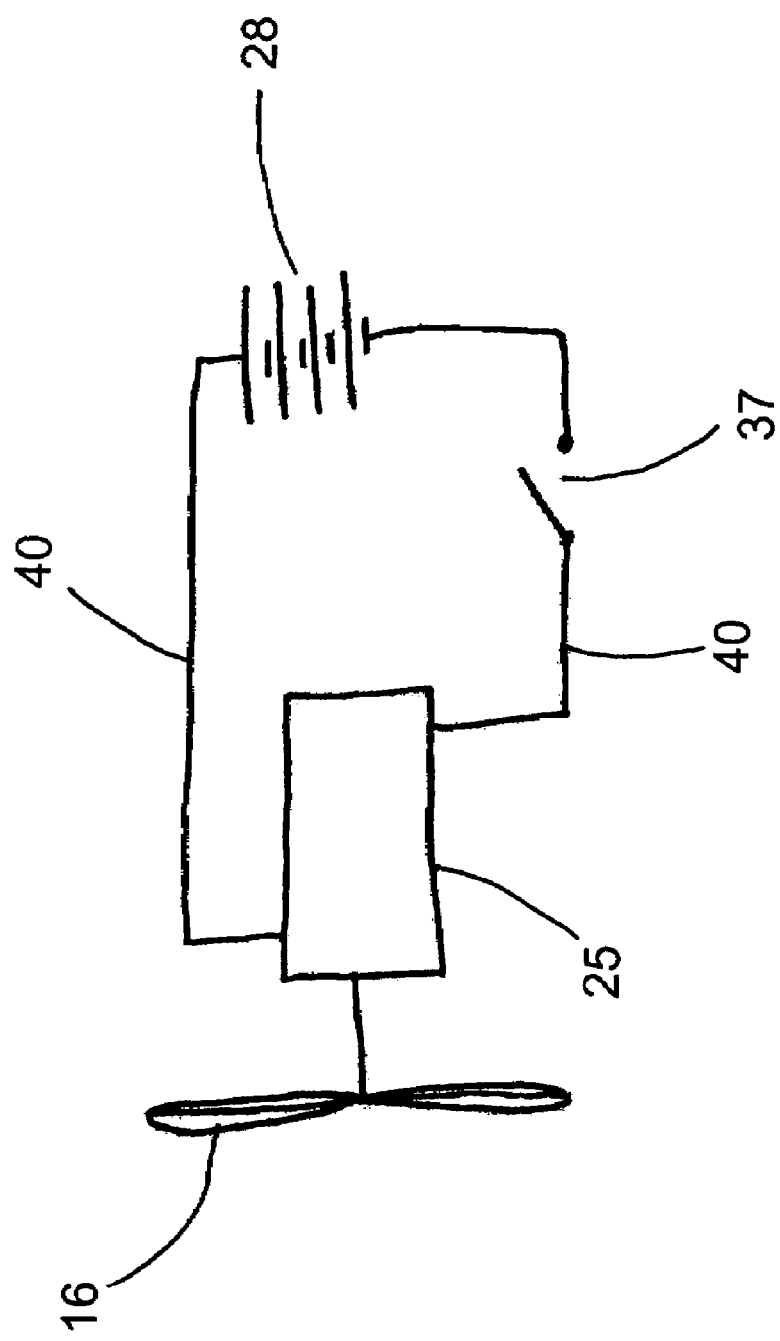
FIG. 3 shows an electrical schematic diagram for a line installing apparatus according to one embodiment of the present invention.

Referring to FIG. 3, the motor 25 is powered by a suitable battery 28. A simplex switch 37 controls power to the motor 25. The battery 28 is connected to the motor by suitable wires 40 through the switch 37. An appropriate fan 16 that can be used in the present invention includes the "VasaFan 55G", which is a ducted fan provided by Hobby-Lobby International, Inc. An appropriate motor 25 that can be used with the present invention includes the "S-280" 7.2-8.4 volt Ferrite Motor manufactured by Great Planes Model Manufacturing Company and provided by Tower Hobbies. In a preferred embodiment, the battery 28 is a Lithium polymer rechargeable battery such as the ElectriFly Lithium-Polymer cell pack manufactured by Great Planes Model Manufacturing Company.

In use, a long string or 'jet line' is attached to the ring 34, and the switch 37 is positioned to provide power to the motor 25. Once the fan is spinning, the "mouse" 10 is placed in an open end of a conduit and released. The "mouse" 10 will fly through the conduit and can be recovered at the other end. The articulated harness connection enables the "mouse" 10 to negotiate bends in the conduit, which, in some cases can be several hundred feet long. After the "mouse" 10 has been recovered, the 'jet line' is used to pull a wire, telephone line, or fiber optic cable through the conduit.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

What is claimed is:

1. An apparatus for installing lines in a conduit, comprising:
    a generally hollow body having a harness hingedly attached to said body;
    a fan and motor installed in said body; and
    a connection point connected to said body for attaching a jet line thereto
        wherein said fan and motor are mounted inside said body, and
        wherein said motor is drivingly engaged with said fan such that operation of said motor causes relative motion between said fan and said body.

2. The apparatus for installing lines in a conduit according to claim 1, wherein said connection point is attached to said harness.

3. The apparatus for installing lines in a conduit according to claim 1, wherein said motor is an electric motor, said apparatus further comprising a battery.

4. The apparatus for installing lines in a conduit according to claim 3, further comprising a switch for selectively supplying electrical energy from said battery to said motor.

5. The apparatus for installing lines in a conduit according to claim 1, wherein said body is aerodynamically shaped.

6. The apparatus for installing lines in a conduit according to claim 1, wherein said harness is articulated with respect to said body.

7. A method of installing lines in a conduit, comprising the steps of:
    providing a generally hollow body having a harness hingedly attached to said body, said body comprising a fan and motor installed in said body;
        wherein said fan and motor are mounted inside said body, and
        wherein said motor is drivingly engaged with said fan such that operation of said motor causes relative motion between said fan and said body;
    connecting a jet line to said body;
    placing said body into one end of said conduit; and
    causing said body to fly through said conduit.

8. The method of installing lines in a conduit according to claim 7, further comprising the steps of attaching said jet line to said harness.

9. The method of installing lines in a conduit according to claim 7, wherein said motor is an electric motor, said body further comprising a battery.

10. The method of installing lines in a conduit according to claim 9, said body further comprising a switch for selectively supplying electrical energy from said battery to said motor.

11. The method of installing lines in a conduit according to claim 10, further comprising the steps of placing the switch in a position to supply power from said battery to said motor before placing said body into one end of said conduit.

12. The method of installing lines in a conduit according to claim 7, wherein said body is aerodynamically shaped.

13. The method of installing lines in a conduit according to claim 7, wherein said harness is articulated with respect to said body.

14. The method of installing lines in a conduit according to claim 7, further comprising the steps of:
    after said body has flown through said conduit, using said jet line to pull a wire, telephone line, or fiber optic cable through the conduit.

* * * * *